United States Patent [19]

Hedlund et al.

[11] Patent Number: 4,506,792
[45] Date of Patent: Mar. 26, 1985

[54] ARTICULATED WAIST TERRAIN VEHICLE

[75] Inventors: Bo P. S. Hedlund; Erik Arnoldsson, both of Söderhamn, Sweden

[73] Assignee: Kockums Industri AB, Soderhamn, Sweden

[21] Appl. No.: 354,958

[22] Filed: Mar. 5, 1982

[30] Foreign Application Priority Data

Mar. 13, 1981 [SE] Sweden ................................ 8101626

[51] Int. Cl.³ .............................................. B66C 23/36
[52] U.S. Cl. .................................... 212/223; 212/244; 180/89.13; 280/492
[58] Field of Search ................ 212/175, 180, 182–189, 212/195, 244, 223, 254, 265, 141, 162; 180/89.13, 265, 266; 280/492–494, 400

[56] References Cited

U.S. PATENT DOCUMENTS

| 1,405,159 | 1/1922 | Polaski et al. | 180/266 |
| 2,461,877 | 2/1949 | Brereton | 212/247 |
| 2,675,927 | 4/1954 | Tourneau | 212/244 |
| 3,042,233 | 7/1962 | Wills | 212/245 |
| 3,398,984 | 8/1968 | Ajero | 180/89.13 |
| 3,601,169 | 8/1971 | Hamilton et al. | 212/162 |
| 3,680,720 | 8/1972 | Strange | 212/244 |
| 3,807,586 | 4/1974 | Holopainen | 180/265 |
| 3,963,132 | 6/1976 | Dufour | 180/89.13 |
| 4,031,976 | 6/1977 | Lambert | 212/141 |
| 4,053,061 | 10/1977 | Lester | 212/165 |
| 4,079,955 | 3/1978 | Thorpe et al. | 280/492 |
| 4,126,198 | 11/1978 | Martin | 180/89.13 |
| 4,200,315 | 4/1980 | Carlsson | 280/492 |
| 4,310,098 | 1/1982 | Dirksen | 212/265 |
| 4,350,190 | 9/1982 | McColl | 180/89.13 |

Primary Examiner—Trygve M. Blix
Assistant Examiner—Stephen P. Avila
Attorney, Agent, or Firm—Stevens, Davis, Miller & Mosher

[57] ABSTRACT

In waist articulated terrain vehicles, especially forest machines, with a wheeled forward section (1), a rear section (5), and a driver's cab (11), driver comfort can be substantially increased by the cab (11) being so mounted on the vehicle that it is substantially unaffected by the tilting movements of the forward section about an axis in the travelling direction thereof, simultaneously as it is adapted for accompanying the forward section in its steering movements.

3 Claims, 6 Drawing Figures

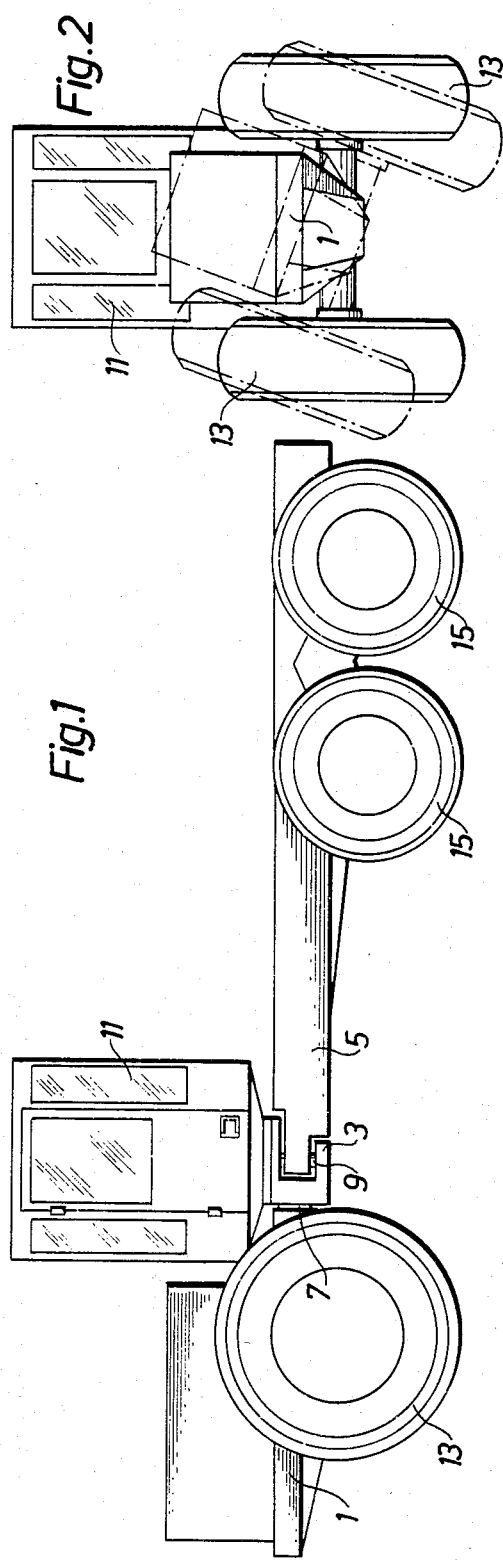
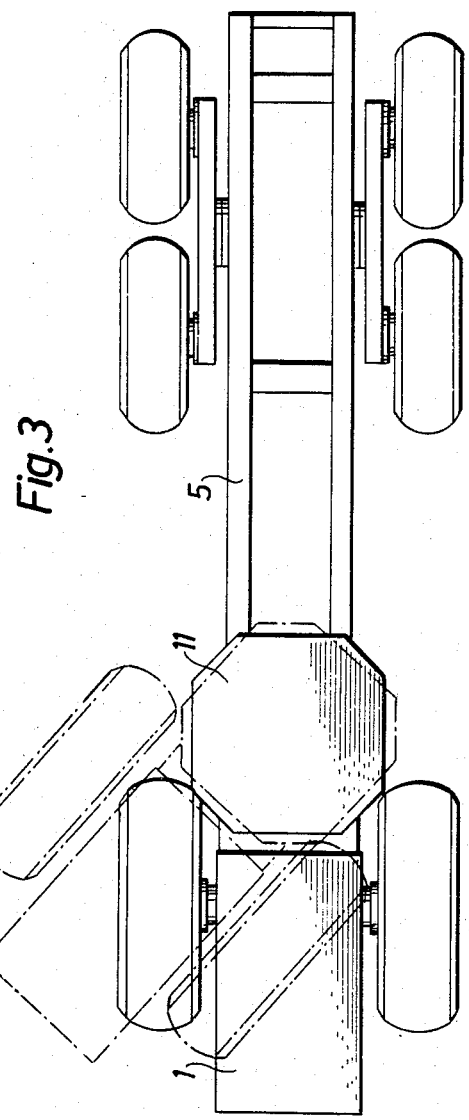

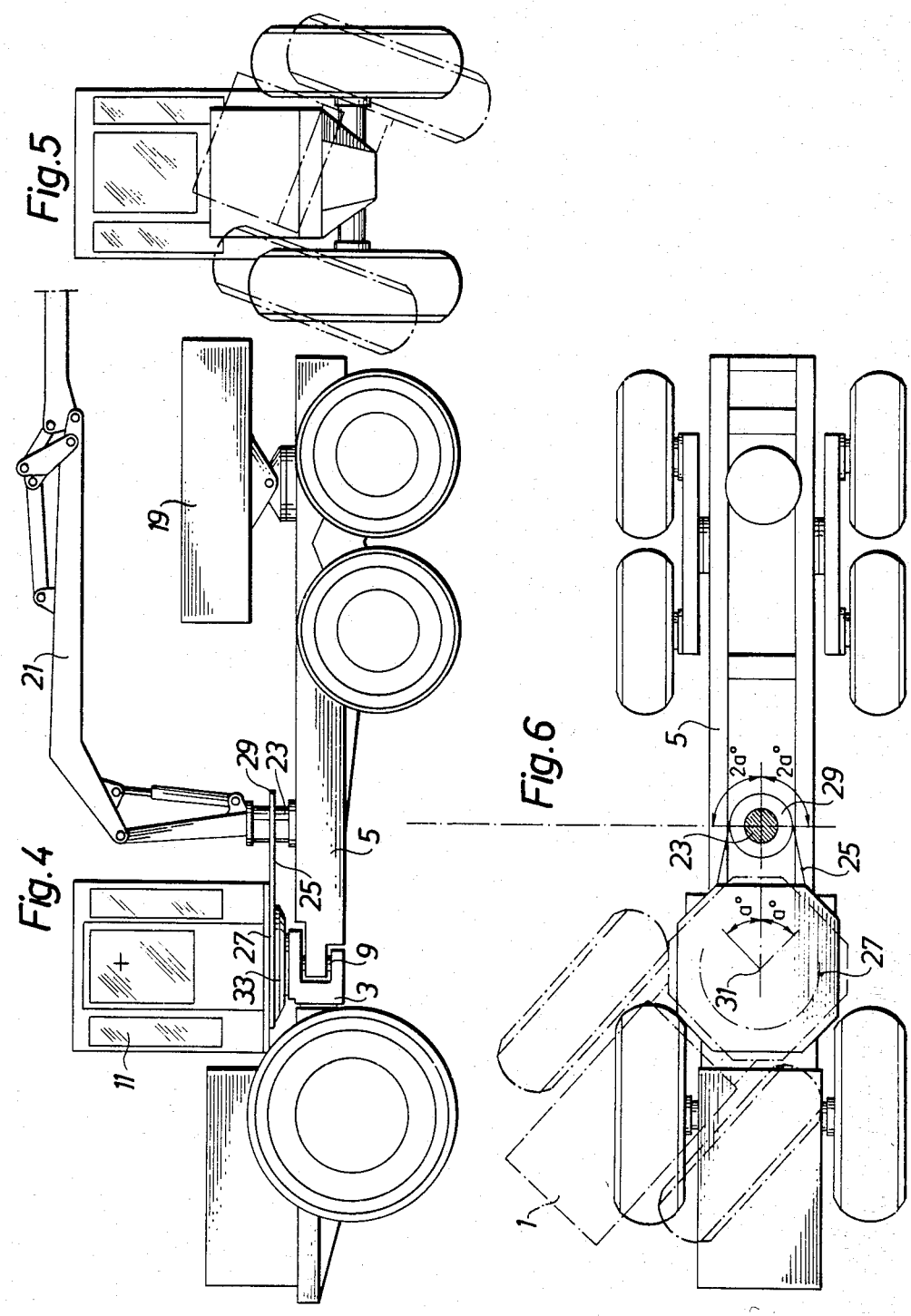

ARTICULATED WAIST TERRAIN VEHICLE

The present invention relates to articulated waist terrain vehicles, particularly forest machines. Such vehicles include a chassis with a wheeled forward section and a wheeled rear section, a driver's cab and usually one or more working implements. Apart from steering the vehicle in a desired direction, waist articulation with its vertical articulating pin also permits maneuvering the forward and rear sections of the vehicle to obtain maximum stability in different dispositions of the vehicle in the terrain.

In order to take up irregularities in the terrain, the vehicle axles must be able to swing relative each other round a longitudinal, substantially horizontal shaft. In conventional vehicles of this kind, the forward section carries the engine and drive's cab while the rear section carries working implements or load. Since the greatest loading on the ground will be under the working implements or load, the rear section is generally provided with a plurality of wheels arranged as bogies. The forward section or the front axle by itself has a suspension allowing the front and rear axles to swing relative each other. Both kinds of suspension are to be found in the prior art.

When the cab is mounted on the forward section so that it accompanies the movements thereof in the travelling and lateral tipping directions, the driver is subjected to the effects of tipping, and lateral movements are particularly difficult for the driver to withstand. On the other hand, when the rear section is provided with a bogie, it only tips half as much laterally for the same irregularities. A fixed location of the cab relative the rear section has therefore been proposed and even put into effect, the vehicle then being provided with a cradled front axle. As the cab can then be placed at a relatively large distance from the engine it will also be possible to avoid the noise and temperature problems in the cab occurring when it is placed directly adjacent the engine. The advantage of the cab accompanying the forward section in its steerng movement, which is advantageous for driving view and safety is, on the other hand, lost when the cab is placed on the rear section.

The present invention relates to eliminating the above-mentioned drawbacks while retaining the advantages.

A vehicle in accordance with the invention has the characterizing features disclosed in the claims.

A vehicle in accordance with a preferred embodiment of the invention is characterized by an intermediate section mounted between the forward and rear sections of the chassis and connected to one of them by a substantially horizontal articulated shaft in the travelling direction of the vehicle, and is connected to the other section by means of a substantially vertical articulating pin, the driver's cab being carried by said intermediate section.

The intermediate section is usually connected to the forward section by means of the horizontal articulating shaft, and to the rear section by means of the vertical pin. The cab will thus be rigidly connected to the rear section in the tipping direction, the latter section having a bogie for smoothing out tipping movement.

The engine is preferably placed on a fixed forward shaft where the space between the wheels can be utilized to a maximum. A pivoting or swinging shaft namely encroaches on the space, especially in width, which can be utilized for installing the engine.

The horizontal tipping or tilting articulating member is placed behind the engine but in front of the cab, thus screening off vibration, noise and temperature. For placing the cab, the intermediate section is therefore formed between the horizontal articulating member and the vertical articulation so that cab attachments can be expeditiously effected. There is further obtained with this placing the said advantage that the cab accompanies the direction of the forward section during travel.

The intermediate section is suitably made short in relation to the forward and rear sections, seen in the travelling direction of the vehicle. A cab may be rigidly mounted on the intermediate section, but may also be pivotably mounted thereon for movement about a vertical axis, whereby it may possibly be restrainable in desired angular positions.

The invention will now be described in detail in the following in conjunction with the appended drawings, on which FIGS. 1-3 illustrate an embodiment of a vehicle in accordance with the invention, FIG. 1 illustrating the vehicle seen from one side, FIG. 2 from the front, and FIG. 3 from above.

FIGS. 4-6 illustrate in the same way as FIGS. 1-3 a second embodiment of the vehicle supplemented with a working implement in the form of a knuckled jib crane.

The vehicle according to FIGs. 1-3 includes a chassis with a forward section 1 carried by the front wheels 13 of the vehicle, a rear section 5 carried by the rear wheels 15 of the vehicle, and an intermediate section 3 articulatedly connected to the forward section about a shaft 7 extending in a vertical central plane through the vehicle in its longitudinal direction and is directed horizontally in the normal disposition of the vehicle. The intermediate section 3 is coupled to the rear section 5 by means of a shaft 9 which extends vertically in the normal disposition of the vehicle and is situated in the above-mentioned vertical central plane through the vehicle. The driver's cab 11 is rigidly mounted on the intermediate section 3.

By the cab 11 being placed on the intermediate section 3, in relation to which the vehicle forward section with carrying wheels 13 can swing arbitrarily about the shaft 7, the cab will not accompany such twisting movements, which can be considerable in very irregular terrain, as illustrated by FIG. 2. There is thus achieved considerable increase in driver comfort when the machine is used in irregular terrain.

The shaft 7 does not need to extend entirely horizontally in the normal attitude of the vehicle, but can be somewhat inclined to suit the construction of the vehicle. According to FIGS. 1-3, the cab 11 is placed essentially above the vertical articulating shaft 9, but such a location is not necessary. For example, the cab can suitably be mounted somewhat behind or even somewhat in front of the pin 9.

The intermediate section 3 is illustrated as a rigid unit, but it is also conceivable to have it composed of two or more mutually connected parts.

A second embodiment of the vehicle in accordance with the invention is illustrated in FIGS. 4-5, the basic structure of the vehicle being in agreement with that illustrated according to FIGS. 1-3, but differing in that it has a processing unit, e.g. a trimming unit 19, on the chassis rear section 5 and a knuckle jig crane 21 rotatably mounted on the rear section 5 with the aid of a horizontal bearing 23. The unit 19 and crane 21 are not shown in FIGS. 5 and 6.

The cab 11 is rotatably mounted on the intermediate section 3 by means of a bearing, e.g. a slewing bearing 33 with a vertical turning axis 31. This is illustrated as coincident with the axis of the vertical pin 9 included in the chassis waist articulation.

The base structure of the cab 11 includes a toothed ring 27. At the same level the mounting 23 of the crane is provided with a toothed ring 29, and a chain 25 is laid round the toothed rings 27 and 29. The latter have a diameter ratio such that when the crane 21 turns an angle $\beta$, the cab turns an angle $\alpha$ which can be a predetermined optional function of $\beta$. Suitably, $\alpha$ can be about the same or less than $\beta$ and $\alpha$ is shown to be half of $\beta$ in the Figures, i.e. when the crane has turned an angle $2\alpha$ according to FIG. 6, the cab has turned an angle $\alpha$.

The intention with this arrangement is to increase the ability of the driver to view the entire work process from where a tree is collected from the ground until it has been fed into the processing unit 19. The cab can be disengagable from the crane and fixable in an optional angular position.

In FIG. 6, the forward section is illustrated by chain-dotted lines to be directed at an angle $\alpha$ from its basic direction illustrated with full lines, since an angular attitude of this kind is usual for increasing the stability of the vehicle during work. The chain-dotted position of the cab accidently happens to coincide with the angular position of the forward section. It may be said that the cab attitude corresponds to what is the case just after the machine has been set up for work.

The actual driving of the crane and cab movements in the horizontal plane has not been shown, but is provided by conventional, suitably hydraulic, power means.

The invention is not limited to the illustrated and described embodiments, since many modifications and variations thereof are possible within the scope of the invention. It is mentioned here that there is a possibility of mounting the cab on the rear section, above or close to the waist pin, and also making it rotatable in the horizontal plane in relation to the rear section, means being adapted enabling such rotational control of the cab that it accompanies the forward section in the steering movements thereof.

We claim:

1. An articulated waist terrain vehicle with a chassis and a driver's cab and at least one work implement mounted on said chassis, said chassis comprising a wheeled forward section and a wheeled rear section and an intermediate section mounted between and supported only be said forward and rear sections, and connected to the forward section by means of a substantially horizontal articulating shaft extending in the vehicle travelling direction, and connected to the rear section by means of a substantially vertical articulating pin; the cab being mounted on said intermediate section so that it is fixed in longitudinal orientation in relation to the forward section when the vehicle is travelling in the forward direction to accompany the forward section in the essentially longitudinal steering movements thereof.

2. The vehicle as claimed in claim 1 in which the intermediate section is short, seen in the vehicle travelling direction, in comparison with the forward and rear sections.

3. The vehicle as claimd in claim 1 in which said work implement is a crane, rotatably mounted about a vertical axis on the rear section.

* * * * *